(12) United States Patent
Gonzalez et al.

(10) Patent No.: US 9,730,153 B2
(45) Date of Patent: Aug. 8, 2017

(54) SYSTEM AND METHODS FOR MULTI-OBJECTIVE CELL SWITCH-OFF IN WIRELESS NETWORKS

(71) Applicant: Huawei Technologies Co., Ltd., Shenzhen (CN)

(72) Inventors: David G. Gonzalez, Barcelona (ES); Halim Yanikomeroglu, Ottawa (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 14/334,134

(22) Filed: Jul. 17, 2014

(65) Prior Publication Data

US 2015/0023163 A1 Jan. 22, 2015

Related U.S. Application Data

(60) Provisional application No. 61/847,403, filed on Jul. 17, 2013.

(51) Int. Cl.
*H04L 12/24* (2006.01)
*H04W 52/02* (2009.01)
(Continued)

(52) U.S. Cl.
CPC ..... *H04W 52/0206* (2013.01); *H04L 41/0833* (2013.01); *H04W 16/24* (2013.01);
(Continued)

(58) Field of Classification Search
CPC .............. H04W 24/02; H04W 28/0231; H04L 41/0823–41/0836
See application file for complete search history.

(56) References Cited

U.S. PATENT DOCUMENTS

| 7,996,344 | B1 | 8/2011 | Goel |
| 2005/0041584 | A1 | 2/2005 | Lau et al. |

(Continued)

OTHER PUBLICATIONS

Huawei, "Overview to LTE energy saving solutions to cell switch off/on" (R3-100162), Jan. 18-22, 2010, 3GPP TSG-RAN WG3#66bis, Valencia, Spain, 5 pages.*

(Continued)

*Primary Examiner* — Hoon J Chung
(74) *Attorney, Agent, or Firm* — Slater Matsil, LLP (57) ABSTRACT

Embodiments are provided for a multi-objective scheme for solving a cell switch-off problem. The multi-objective solution seeks to minimize or reduce network energy consumption by switching off some of the cells in the network while allowing enough capacity according to traffic needs and quality of service requirement. An embodiment method includes determining, for each one of a plurality of established traffic profiles, a set of solutions with respect to a number of active cells from a plurality of cells in the network and an aggregate network capacity. The method further includes matching a given traffic profile to one of the established traffic profiles, and evaluating performances of the solutions corresponding to that traffic profile. A solution from the solutions is then selected in accordance with the evaluation. The selected solution indicates which of the cells in the wireless network to be switched off.

22 Claims, 11 Drawing Sheets

(51) Int. Cl.
*H04W 28/02* (2009.01)
*H04W 16/24* (2009.01)
*H04W 76/04* (2009.01)
*H04W 24/02* (2009.01)

(52) U.S. Cl.
CPC ........ *H04W 24/02* (2013.01); *H04W 28/0231* (2013.01); *H04W 52/0258* (2013.01); *H04W 76/046* (2013.01); *H04W 76/048* (2013.01); *Y02B 60/50* (2013.01)

(56) References Cited

U.S. PATENT DOCUMENTS

| | | |
|---|---|---|
| 2005/0143845 A1 | 6/2005 | Kaji |
| 2006/0026679 A1 | 2/2006 | Zakas |
| 2010/0331049 A1 | 12/2010 | Diaz et al. |
| 2012/0004009 A1 | 1/2012 | Lindoff et al. |
| 2012/0244869 A1 | 9/2012 | Song et al. |
| 2013/0005385 A1* | 1/2013 | Hunukumbure ...... H04W 16/22 455/517 |
| 2013/0122913 A1 | 5/2013 | Agarwal et al. |
| 2013/0137446 A1 | 5/2013 | Narlikar et al. |
| 2013/0310048 A1* | 11/2013 | Hunukumbure .. H04W 52/0206 455/443 |

OTHER PUBLICATIONS

Jedidi A., Caminada A., Finke G. (2004) 2-Objective Optimization of Cells Overlap and Geometry with Evolutionary Algorithms. In: Raidl G.R. et al. (eds) Applications of Evolutionary Computing. EvoWorkshops 2004. Lecture Notes in Computer Science, vol. 3005. Springer, Berlin, Heidelberg, 10 pages.*
Alaca, et al., "A genetic Algorithm Based Cell Switch-off Scheme for Energy Saving in Dense Cell Deployments" in Proc. of IEEE Global Telecommunications Conferences Workshops (GLOBECOM Wkshps 2012), The 8th Broadband Wireless Access Workshop, IEEE 978-1-4673-4941-3/12, Dec. 3-7, 2012, pp. 63-68.
Beitelmal, et al., "A Set Cover Based Algorithm for Cell Switch-Off with Different Cell Sorting Criteria" ICC'14—W3: Workshop on Small Cell and 5G Networks, IEEE 978-1-4799-4640-2/14, Feb. 2014, pp. 641-646.
Bousia, et al., "Energy Efficient Base Station Maximization Switch Off Scheme for LTE-Advanced" in Proc. of IEEE 17th IEEE International Workshop on Computer Aided Modeling and Design of Communication Links and Networks (CAMAD), IEEE 978-1-4673-3125-8/12, Sep. 17-19, 2012, pp. 256-260.
Gonzalez, "Research Report, A Multiobjective Framework for Cell Switch-Off in Dense Cellular Networks" Carleton Unversity Ottawa, Canada, Mar. 4, 2013-Jun. 30, 2013, Report No. 201306.02, Jun. 20, 2013, pp. 1-35.
Gonzalez, et al., "A Novel Multiobjective Framework for Cell Switch-off in Dense Cellular Networks" in Proc. of IEEE International Conference on Communications (ICC 2014), Mobile and Wireless Networking Symposium, IEEE 978-1-4799-2003-7/14, Jun. 10-14, 2014, pp. 2647-2653.
Kang, et al., "Base Station Switching Based Dynamic Energy Saving Algorithm for Cellular Networks" in Proc. of 3rd IEEE International Conference on Network Infrastructure and Digital Conten (IC-NIDC2012), IEEE 978-1-4673-2204-1/12, Sep. 21-23, 2012, pp. 66-70.
Morosi, et al., "Sleep mode management in cellular networks: a traffic based technique enabling energy saving" Transactions on Emerging Telecommunications Technologies, Feb. 2013, 11 pages.
Niu, et al., "Cell Zooming for Cost-Efficient Green Cellular Networks" IEEE Communications Magazine, vol. 48, No. 11, Nov. 2010, 0163-6804/10, pp. 74-79.
Peng, et al., "Traffic-Driven Power Saving in Operational 3G Cellular Networks" in Proc. of ACM 17th Annual International Conference of Mobile Computing and Networking (MobiCom 2011), ACM 978-1-4503-092-4/11/09, Sep. 19-23, 2011, pp. 121-132.
Saker et al., "Minimizing energy comsumption via sleep mode in green base station" in Proc. of IEEE Wireless Communications and Networking Conference (WCNC 2010) IEEE, 978-1-4244-6398-5/10, Apr. 18-21, 2010, 6 pages.
Zhou, et al., "Green Mobile Access Network with Dynamic Base Station Energy Saving" in Proc. of ACM 15th Annual International Conference on Mobile Computing and Networking (MobiCom 2009), ACM 978-1-60558-702-8/09/09, Sep. 20-25, 2009, 3 pages.
International Search Report and Written Opinion received in International Application No. PCT/US14/47041, mailed Nov. 18, 2014, 7 pages.
Marsan, M., et al., "Switch-Off Transients in Cellular Access Networks with Sleep Modes," IEEE International Conference on Communications Workshops (ICC), Jun. 5-9, 2011, pp. 1-6.
Oh, E., et al., "Energy Savings through Dynamic Base Station Switching in Cellular Wireless Access Networks," IEEE Global Telecommunications Conference (GLOBECOM 2010), Dec. 6-10, 2010, pp. 1-5.
Qin, X., et al., "Optimal matching between energy consumption of Base Stations and traffic load in green cellular networks," 1st IEEE International Conference on Communications in China (ICCC), Aug. 15-17, 2012, pp. 464-468.
Saker, L., et al., "Sleep mode implementation issues in green base stations," IEEE 21st International Symposium on Personal Indoor and Mobile Radio Communications (PIMRC), Sep. 26-30, 2010, pp. 1683-1688.

* cited by examiner

FIG. 16

# SYSTEM AND METHODS FOR MULTI-OBJECTIVE CELL SWITCH-OFF IN WIRELESS NETWORKS

This application claims the benefit of U.S. Provisional Application No. 61/847,403 filed on Jul. 17, 2013 by David G. Gonzalez et al. and entitled "System and Method for a Multiobjective Framework for Cell Switch-Off in Dense Cellular Networks," which is hereby incorporated herein by reference as if reproduced in its entirety.

TECHNICAL FIELD

The present invention relates to wireless communications, and, in particular embodiments, to a system and methods for multi-objective cell switch-off in cellular networks.

BACKGROUND

Cell switch-off (CSO) is a mechanism to reduce energy consumption in cellular networks, such as next generation cellular networks and dense cell deployments. The CSO problem includes finding the smallest set of cells able to provide the desired level of quality of service (QoS) to users. Resolving the problem is challenging for several reasons, including the increasingly inhomogeneous and bursty nature of traffic in space and time. Another issue is that the decision (search) space is an exponential function of the number of cells, e.g., there are $2^L$ solutions where L is the number of cells. Assumptions are made, such as for interference modeling, to reduce the complexity in finding near-optimal solutions. Such simplifying assumptions can affect the accuracy of the solution. Hence, there is a need for an efficient and improved CSO solution scheme.

SUMMARY OF THE INVENTION

In accordance with an embodiment, a method, performed by a network component for cell switch-off in a wireless network, includes determining, for each one of a plurality of traffic profiles, a set of solutions with respect to a number of active cells from a plurality of cells in the network and an aggregate network capacity. The method further includes matching a given traffic profile to one of the plurality of traffic profiles, and evaluating performances of the solutions corresponding to the one of the plurality of traffic profiles. A solution from the solutions is then selected in accordance with the evaluation. The selected solution indicates which of a plurality of cells in the wireless network to be switched off.

In accordance with another embodiment, a method performed by a network component for cell switch-off in a wireless network includes modeling a plurality of traffic distribution patterns as probability spaces over a coverage area or the wireless network. The method further includes calculating a set of solutions for each one of the traffic distribution patterns according to a multi-objective function. The multi-objective function is established to reduce a network energy level in terms of active cells and maintains an aggregate network capacity according to traffic need. The set of solutions for each one of the traffic distribution patterns is stored in a database. The method further includes detecting a current traffic distribution pattern of the wireless network at a predefined time interval, and matching the current traffic distribution pattern to one of the traffic distribution patterns stored in the database. A solution is then selected from the set of solutions corresponding to the one of the traffic distribution patterns.

In accordance with yet another embodiment, a network component enabling cell switch-off in a wireless network comprises at least one processor and a non-transitory computer readable storage medium storing programming for execution by the at least one processor. The programming includes instructions to determine, for each one of a plurality of traffic profiles, a set of solutions with respect to a number of active cells from a plurality of cells in the network and an aggregate network capacity, and match a given traffic profile to one of the plurality of traffic profiles. The programming includes further instructions to evaluate performances of the solutions corresponding to the one of the plurality of traffic profiles, and select a solution from the solutions in accordance with evaluating the performances of the solutions. The selected solution indicates which of a plurality of cells in the wireless network to be switched off.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Typical CSO schemes for solving the CSO problem include snapshot based CSO schemes. Such schemes use network-wide scheduling in each snapshot of a determined time period with the goal of minimizing the number of cells or base stations in the network. The terms base stations and cells are used herein interchangeably to refer to radio serving nodes and their coverage regions. In such schemes, traffic information is taken into account explicitly (e.g., user locations and channel states are assumed to be known) to make the cell switch on/off decisions. The decisions are made at a relatively short time scale with oversimplifying assumptions. The schemes employ heuristic approaches, such as centralized greedy-drop or greedy-add algorithms. The limitations of such schemes include requiring high real-time complexity and a mainly centralized operation by a central decision making component. The schemes also cause difficulty in terms of scalability (e.g., proportional to the number of users and cells) and feasibility (e.g., a high number of on/off transitions).

The CSO schemes also include other long term traffic behavior based CSO schemes. Such schemes utilize long term traffic behaviour based on traffic prediction and estimation. The schemes based on long term traffic behaviour assume long-term slow variation and hence fixed and cyclic traffic load over shorter times. The schemes are more suitable at the macro-cellular network level but may not be feasible for more localized implementation at a smaller scale of the network. For example, the schemes do not capture more rapid load variations, e.g., for highly bursty data or in Heterogeneous Networks (HetNets) comprising macro cells and lower power cells (e.g., femtocells or pico cells).

Further, switching a cell on and off is a procedure that requires some time to migrate users gradually to the new best serving cells by means of handovers. Due to latency and delay constraints for ensuring QoS, it is desirable to minimize the number of on/off switching procedures, also referred to as transitions, and the resulting handoffs between cells. Another issue to be considered for the CSO procedure is that provider coverage criteria should be fulfilled to avoid significant coverage holes. Another issue is that cellular networks are quite dynamic as users come and go randomly all over the coverage area. In view of such issues, there is a need for efficient solutions to the CSO problem, which consider such issues.

Embodiments are provided herein for a multi-objective scheme for solving the CSO problem. The multi-objective CSO scheme includes a stochastic (random) search to find different sets of network configurations representing efficient solutions (e.g., Pareto efficient solutions) to the CSO problem. The sets of network configurations provide different levels of aggregate capacity and energy consumptions. The solutions are also based on weighted network capacity, which is a metric introduced herein to guide the stochastic search towards network configurations that best (or better) fit each traffic profile. The weighted network capacity is also referred to herein as aggregate network capacity. The multi-objective CSO scheme minimizes or reduces the number of active bases stations (which also minimizes on/off transitions) while allowing enough capacity according to traffic needs. For example, in the solutions, some base stations, which may be statistically needed for future traffic, are kept on. The set of solutions are specific for each network and spatial traffic distribution, which can be modeled as probability spaces over the coverage area. The traffic distribution is also referred to herein as traffic profile or pattern. The solutions can be obtained using heuristic approaches and alternatively using Multi-objective Evolutionary Algorithms (MOEAs). The solutions can be computed off-line, stored in a database, and compared every determined interval of time (e.g., periodically) with current traffic profiles. This reduces the complexity and time for real-time implementation. The solutions can be implemented in a centralized manner by the network or alternatively in a distributed-hierarchical manner. Examples of the CSO objective functions for optimizing energy level consumption and aggregate network capacity are described below. However, other suitable functions or modifications to such functions can be used in other embodiments to achieve the same objectives.

Figure 1:
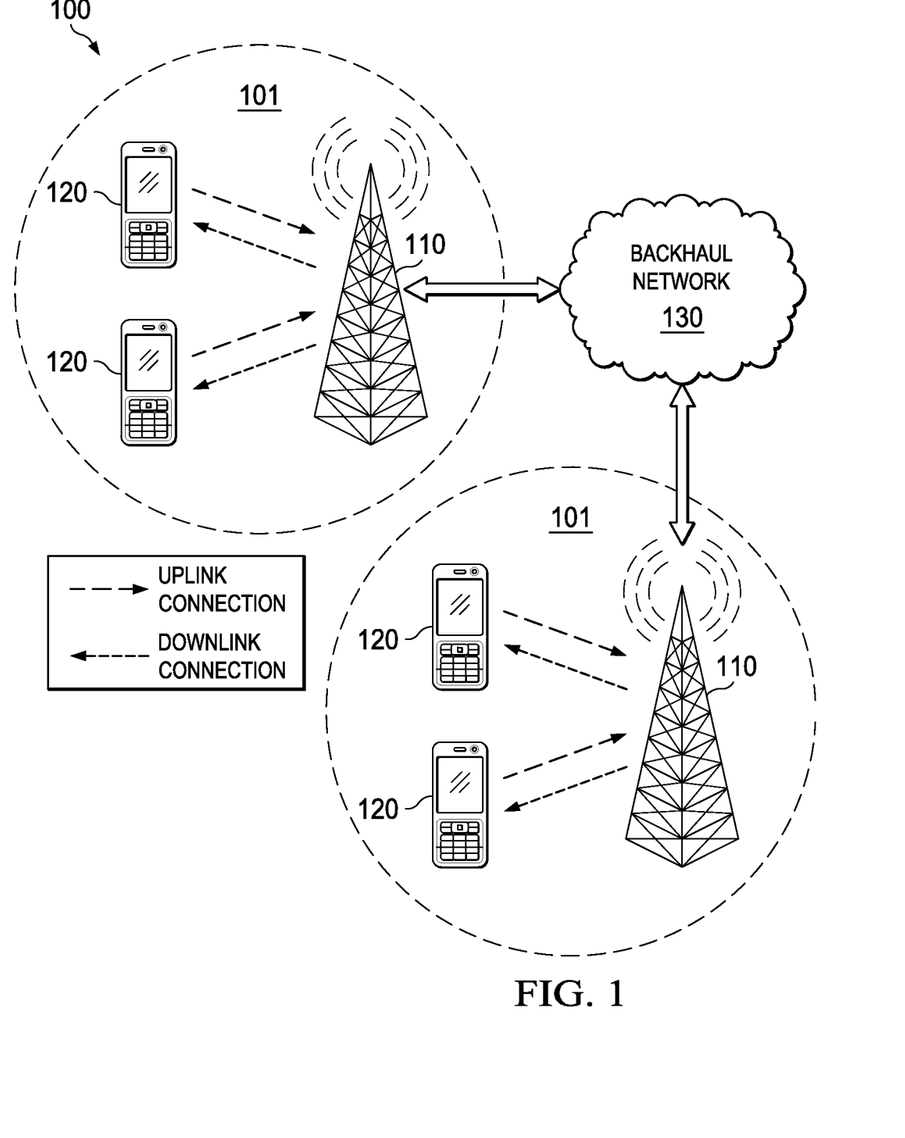
FIG. 1 illustrates a network that can implement embodiments of the disclosure.

FIG. 1 illustrates a wireless (e.g., cellular) network 100 for communicating data. The network 100 comprises a base station (BS) having a coverage area 101, also referred to as a cell, a plurality of client mobile devices 120, and a backhaul network 130. The BS 110 may comprise any component capable of providing wireless access by establishing uplink (dashed line) and/or downlink (dotted line) connections with the mobile devices 120. Examples of the BS 110 include a base station, an enhanced base station (eNB), a femtocell, and other wirelessly enabled devices. The mobile devices 120 may comprise any component capable of establishing a wireless connection with the BS 110, such as a user equipment (UE) or other wirelessly enabled devices. The backhaul network 130 may be any component or collection of components that allow data to be exchanged between the BS 110 and a remote end (not shown). The network can comprise a plurality of cells 101, which may have some overlap between each other. The overlap corresponds to an area with combined coverage from more than one cell 101. In embodiments, the network 100 may comprise various other wireless devices, such as relays, low power nodes, and other user or client devices with wireless communications capability.

The CSO scheme can be implemented in wireless or cellular networks, such as the network 100. The scheme may be implemented by a central server or network controller of the network, or in a distributed manner by controllers associated with the cells or each group of cells, also referred to herein as a cluster of cells. The networks may be dense cellular networks where the number of mobile devices per area (e.g., per cell or cluster) is relatively large. Due to the density of mobile devices, such networks have challenging traffic demands and would benefit substantially from a CSO scheme. This multi-objective scheme aims to minimize (or reduce) the number of active cells or BSs while allowing sufficient network capacity according to traffic need (QoS). For example, a sufficient number of BSs is kept, for a period of time, to minimize or reduce on/off transitions. The scheme can take into account coverage criteria, such as minimum noise level (e.g., signal to noise ratio (SINR)) and received power. The scheme can also model inter-cell interference realistically and allow for flexible quality of service (QoS) definitions. The traffic behavior can be considered implicitly by means of probability spaces. As such, the complexity is independent of the number of users. Traffic pattern prediction/estimation can be added to the scheme, which can reduce the number of lookup tables for obtaining solutions.

Figure 2:
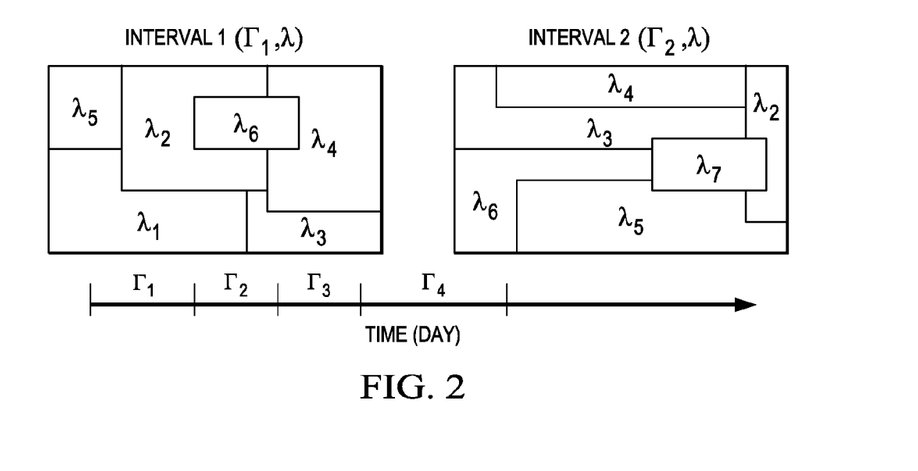
FIG. 2 illustrates traffic profiles.

FIG. 2 illustrates examples of traffic profiles at subsequent time intervals. The intervals can have equal or different lengths in time, e.g., seconds. The traffic profile is an estimation of the traffic pattern using statistical attributes of traffic over a defined interval of time, e.g., as opposed to a snapshot of instantaneous traffic. At each interval, the traffic distribution or profile, F, in a coverage region of the network (e.g., of clusters of cells) is modeled as multiple patches of traffic density. For each patch, the arrival time of users can be modeled as a Poisson (or any other suitable probability function) distributed random variable with a corresponding mean λ. The traffic profile can change at the different intervals. Thus, the traffic profiles at the intervals, the number of patches, the sizes of patches, and/or the respective probability distribution function mean values can change.

The CSO scheme comprises establishing a mathematical system model of the network, its components, and resources. The model can be formulated by mathematical representation, which can be implemented and solved on a suitable processor. According to the model, the cellular system of the network comprises L cells, where L is an integer. Each one of the L cells can be switched on or off (on/off), e.g., for a given interval of time. The system also has a defined bandwidth, $B_{SYS}$, which represents full frequency reuse. In one embodiment, the network is an Orthogonal Frequency-Division Multiple Access (OFDMA) network and the system model is tailored accordingly. The coverage area of a cell is modeled as a grid of A small area elements, also referred to herein as pixels, where A is an integer. The pixels in the grid can have the same size area or different size areas. The pixels may also have the same geometric shape, e.g., squares or rectangles, or variable shapes. An example of a suitable pixel is a square pixel of 20 meters×20 meters. A long term channel gain parameter, G, is introduced, where $G \in \mathbb{R}^{A \times L}$ (the matrix of real numbers in the A×L space). The long term channel gain accounts for large scale fading effects such as propagation losses, antennas gains and shadowing. The cell selection is determined as best SINR policy over a reference signal (RS). The RS transmitted power (RTSP) is represented by the parameter $p_{RS} \in \mathbb{R}^L$. The data channel power is represented as $p_D \in \mathbb{R}^L$. Without loss of generality, $p_D = p_{RS}$. The cell selection is based on the best SINR policy, e.g., based on the best RS received power (RSRP). The received power at each cell, $R \in \mathbb{R}^{A \times L}$, is given by $R(x) = G \cdot \text{diag}(p_{RD} \odot x)$. The pixel a ($a^{th}$ row in R) is served by cell l*, if and only if l*=$\text{argmax}_l R(a, l)$. A binary coverage matrix, S, is also introduced, where $S^c \in \mathbb{R}^{A \times L}$. If a is served by l*, then $S(a, l^*)=1 \cdot S^c$ is the binary complement of S. A pixel is in outage if it does not meet the following criteria: if the minimum received power $R(a, l^*) \geq P_{min}^{Rx}$ and if the minimum SINR $\Psi(a) \geq \psi_{min}$. The average SINR of each pixel, $\Psi \in \mathbb{R}^A$ is given by $\Psi(x)=[(S \odot G) \cdot (p_D \odot x)] \oslash [[(S^c \odot G) \cdot (p_D \odot x)] \oplus \eta]$. The spectral efficiency of each pixel, $\Phi \in \mathbb{R}^A$, is obtained by considering the Shannon capacity, as $g(z)=\log_2(1+z)$. In order to take into account the coverage constraints, the spectral efficiency of the pixel a is given by $\Phi(a)=[u(\Psi(a)-\psi_{min})] \cdot [u(R(a, l^*)-P_{min}^{Rx})] \cdot g(\Psi(a))$.

The scheme also includes two model concepts. The first concept is the network operation point (NOP), which represents any possible state of the network in terms of active and non-active (switched off) cells. Thus, a network composed of L cells, has $2^L$ NOPs. Each NOP can be represented by a binary string x of length L. This can be represented as $x \in \mathcal{L}$, where $\mathcal{L} \in \{0,1\}^L$. The second concept is the network energy level (NEL), which is defined as the number of active cells in a NOP. The $l^{th}$ NEL is defined as $\mathcal{L}_l \in \{x \in \mathcal{L} \mid x \cdot 1 = l\}$.

The formulation above is used to achieve multiple objectives or optimization targets of the CSO scheme. The objectives include minimizing the number of active cells in the network. This can be represented as $f_1(x)=x \cdot 1$. The overall energy consumption in the network can be assumed proportional to the number of active cells. The objectives also include maximizing the weighted network capacity. This can be represented as $f_2(x, \Gamma)=[B_{SYS} \cdot [(A \cdot (\Phi \odot \Gamma)^T) \cdot (S \cdot \text{diag}(n))]] \cdot 1$, where $\Gamma$ is the traffic distribution or profile. The vector $n \in \mathbb{R}^L$ contains the inverse of the sum of each column in S, which represents the number of pixels served by each cell. In an embodiment, $f_2$ can be modified in such a way that bandwidth allocation to pixels is proportional to spectral efficiency or rate in order to improve the cell edge performance. For example, $f_2$ can be modified to provide total uniform coverage needed by the operator. The CSO problem is addressed by means of the NOPs featuring Pareto efficiency in terms of NEL, $f_1$, and weighted network capacity, $f_2$. The search space is thus reduced from $2^L$ to L. The multi-objective problem can be formulated as follows: minimize the difference $[f_1(x)-f_2(x)]$ subject to an allowable outage constraint $((v^T \cdot 1)/A) \leq \delta$. The vector $v \in \mathbb{R}^A$ indicates the outage pattern associated with each NOP x. Therefore, if the pixel a is in outage, then v(a)=1, or is v(a)=0 otherwise. The parameter δ indicates how much (coverage) area is allowed.

Figure 3:
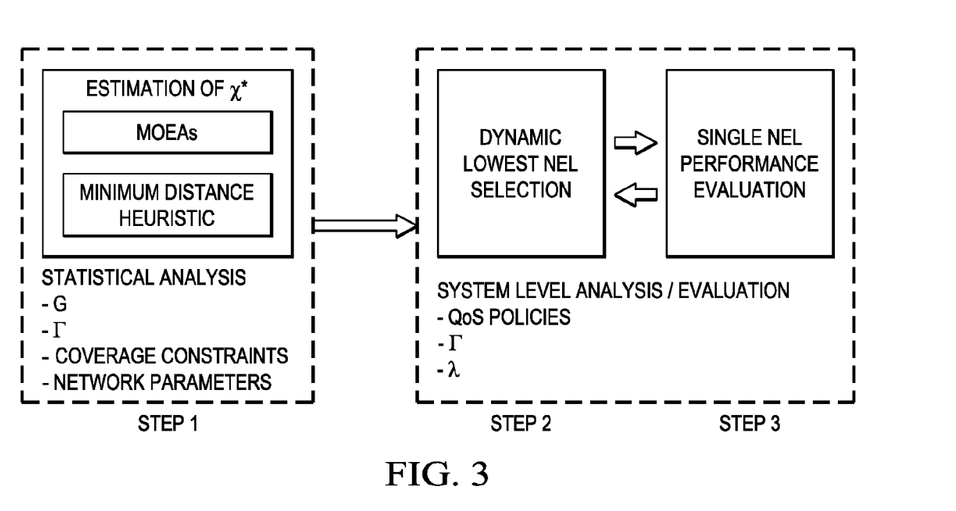
FIG. 3 illustrates an embodiment of a Cell switch-off (CSO) scheme.

FIG. 3 shows an embodiment of the CSO scheme for solving the multi-objective CSO problem. In the solution, a set of Pareto efficient (with respect to $f_1$ and $f_2$) solutions $\chi^*$ is determined for every given traffic profile $\Gamma$. The solutions are based on the network geometry/parameters, traffic profile, and coverage constraints. The estimation comprises the calculation of the long term channel gain, G, by solving the model formulated above using MOEAs or a minimum distance heuristic algorithm. The performance of the estimated set of solutions $\chi^*$ can then be evaluated. This includes determining, for each time interval, which element of $\chi^*$ has the lowest NEL that satisfies the QoS requirements. Selecting the solution with the lowest NEL achieves a best performance but may not be feasible, e.g., due to time constraints or complexity. Alternatively, some solutions can be selected and evaluated. This approach may achieve a near-optimum performance and is feasible, for instance in a hierarchical/distributed implementation, described below.

Figure 4:
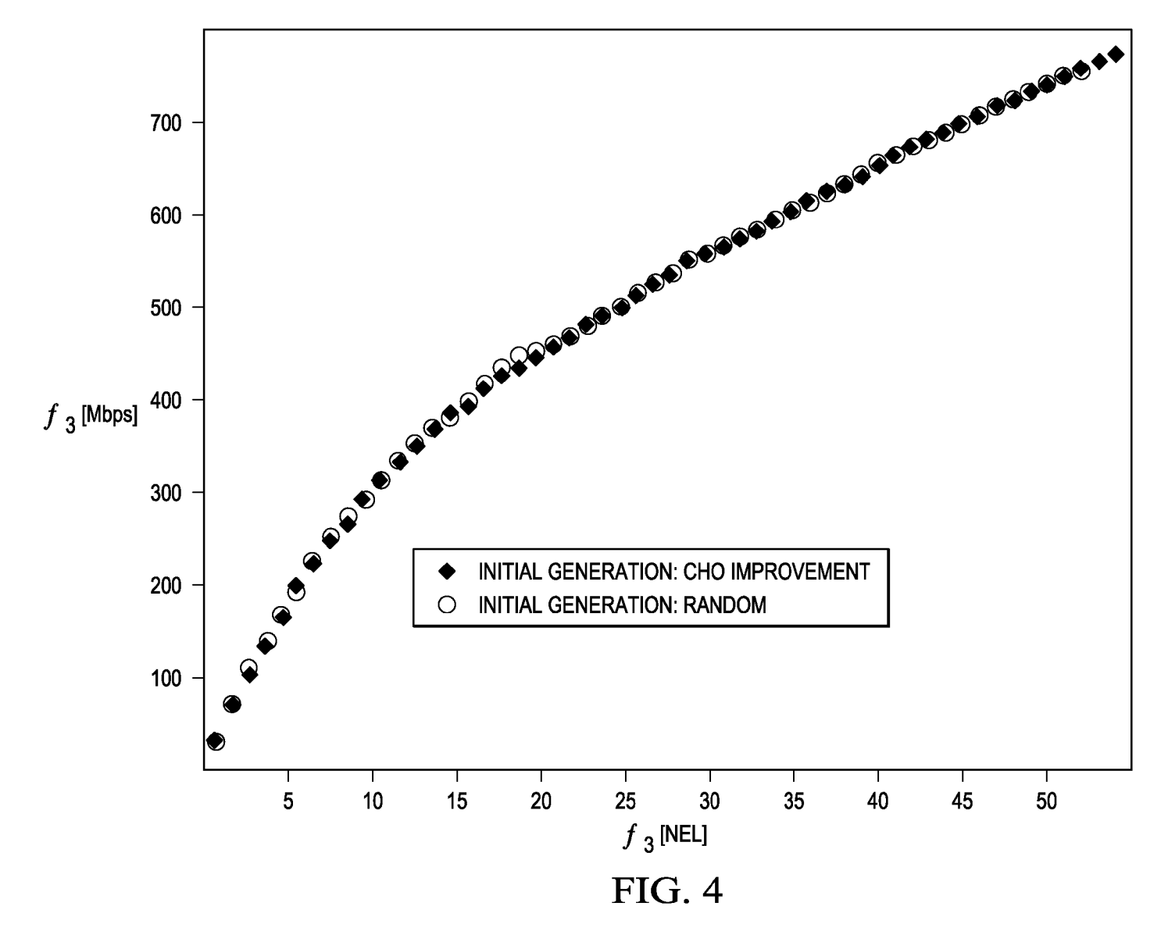
FIG. 4 illustrates a relation between multiple objective functions of the CSO scheme.

FIG. 4 shows a relation between the two functions $f_1$ and $f_2$. The values shown represent solutions $\chi^*$ specific to one traffic profile. The solutions are obtained by considering the tradeoff between aggregate network capacity (related to $f_2$) and the number of switched-off cells (related to $f_1$). These criteria are conflicting objectives, and hence, multi-objective optimization represents a convenient approach to investigate CSO through the Pareto dominance notion. The Pareto efficiency is a concept in multi-objective optimization. A solution $x^* \in \chi$ has Pareto efficiency if and only if there does not exist a solution $x \in \chi$, such that x dominates $x^*$. The set $\chi^*$ of Pareto efficient solutions is called optimal non-dominated set and its image is known as the Optimal Pareto Front (OPF). When a multi-objective problem is solved, it is may be difficult to obtain the OPF due to problem complexity. Instead, a near-optimal or estimated Pareto front (PF) can be found. In FIG. 4, for each NEL considered (value of $f_1$), the solution that maximizes the weighted network capacity (value of $f_2$) is selected. These solutions provide optimal or best aggregate capacity, for instance specifically to the areas where the users are more likely to appear.

As described above, the solutions to the multi-objective CSO problem can be obtained using MOEAs (also referred to sometimes as metaheuristic algorithms), such as using a Non-dominated Sorting Genetic Algorithm II (NSGA-II), e.g., as described in a publication of IEEE Transactions on Evolutionary Computation dated April 2020 by K. Deb et al. and entitled "A Fast and Elitist Multi-objective Genetic Algorithm: NSGA-II," in vol. 6, no. 2, pp. 182-197. Alternatively, the solutions can be obtained using heuristic-based algorithms, such as a minimum hamming distance (also referred to as minimum distance) algorithm. The minimum distance algorithm is used to find a minimum distance set of solutions. An example of the algorithm is as described by the following pseudo code:

```
Input:
    χ₁: Set of NOPs with x · 1 = 1
Output:
    χ*: A set of L NOPs featuring the minimum distance property.
    (xₗ ∈ χ* ∀l = 1:L).
// Initiate the capacity variable;
1 C_max ← 0;
// Initiate the output set;
2 χ* ← ∅;
// Looking for the best NOP with NEL = 1;
3 for each x ∈ χ₁ do
    // Get the Weighted Network Capacity;
    C_Γ ← f₂(x);
    // Look for the best initial point;
    if C_Γ > C_max then
        // Update the best value;
        C_max ← C_Γ;
        // Update the best NOP with NEL = 1;
        x₁ ← x;
    end
end
// Update the output;
χ* ← χ* ∪ {x₁};
// Looking for the rest of NOPs;
for each l = 2 : L do
    // Initiate the capacity variable;
    C_max ← 0;
    // Check which is the best new active cell;
    for each x ∈ ℒ₁ | d_H(x, x_{l-1}) = 1 do
        // Get the Weighted Network Capacity;
        C_Γ ← f₂(x);
        // Look for the best new member;
        if C_Γ > C_max then
            // Update the best value;
            C_max ← C_Γ;
            // Update the best NOP with NEL = 1;
            xₗ ← x;
        end
    end
    // Update the output;
    χ* ← χ* ∪ {xₗ};
end
return χ*.
```

Figure 5:
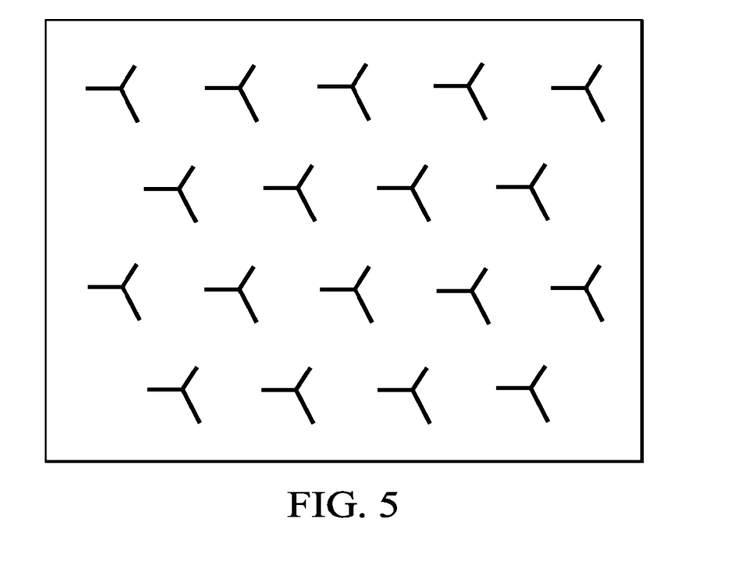
FIG. 5 illustrates a simulation environment with 54 cells.
Figure 6:
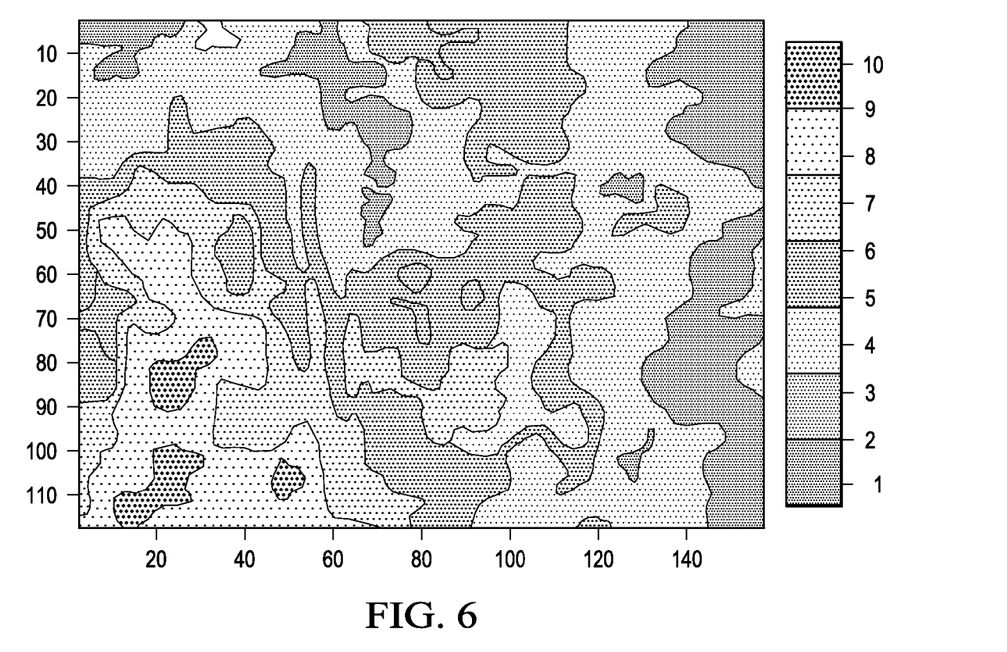
FIG. 6 illustrates a spatial pattern with an irregular spatial traffic distribution according to simulations.
Figure 7:
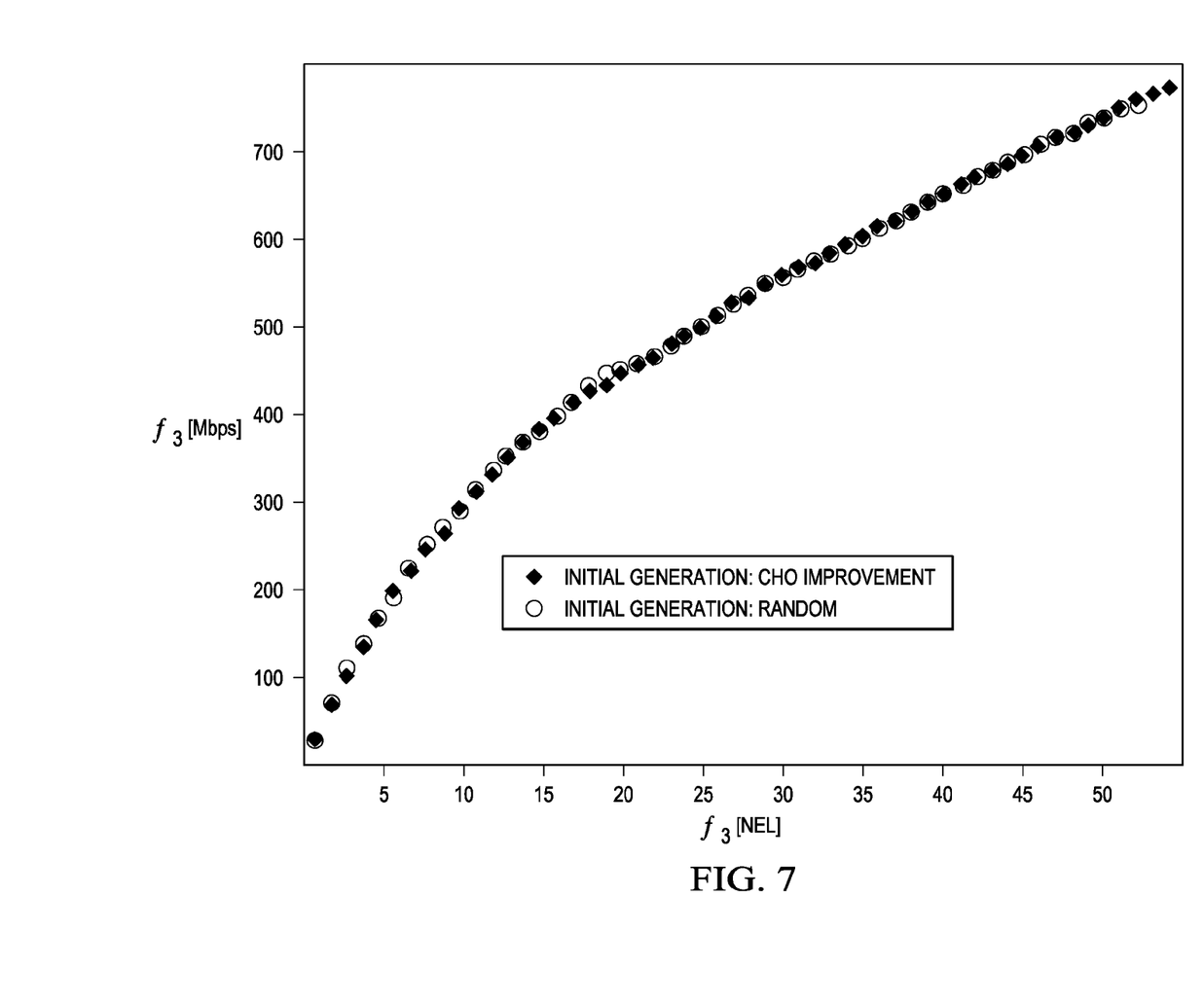
FIG. 7 illustrates weighted network capacity values versus network energy levels according to simulations.

As an example to solving the multi-objective CSO problem, FIG. 5 shows a computer simulation environment with 54 cells. FIG. 6 shows a spatial pattern with an irregular spatial traffic distribution in the 54 cells according to the simulation. The figure shows areas with variable traffic densities, ranging from 10 to 1. FIG. 7 shows the weighted network capacity values versus network energy levels for the spatial traffic distribution. The curve of FIG. 7 represents the Pareto efficient solutions (which are obtained (using NSGA-II) for this traffic distribution). This set of solutions is specific to a spatial traffic profile (traffic distribution), modeled as probability spaces over the coverage area as described above. Multiple sets of solutions can be obtained similarly for multiple corresponding modeled traffic profiles. The sets of solutions can be computed off-line, e.g., prior to implementing the cell switch-off, and stored in a database. During real-time implementation, the current traffic profile is compared every certain time, for instance at each defined interval of time, with the computed traffic profiles. The solutions can be stored in the form of lookup tables in the database. The lookup tables serve to match the existing or real-time traffic profile in the network with a matching (or closest matching) traffic profile considered in the data base. The solutions obtained for a matching profile are then examined to select a solution that satisfies the QoS requirement. The solution corresponds to the NEL ($f_1$ value) associated with a weighted network capacity ($f_2$ value) that fulfils the QoS requirement.

More details regarding the formulation, solution, and optimization of the CSO multi-objective problem are described by David G. Gonzalez et al. in "A Novel Multi-objective Framework for Cell Switch-Off in Dense Cellular Networks," in IEEE Mobile and Wireless Networking Symposium, vol. 6, no. 2, pp. 182-197, dated Jun. 12, 2014, and further by David G. Gonzalez in "A Multiobjective Framework for Cell Switch-Off in Dense Cellular Networks," in a research report of Carleton University, dated June 2013, both of which are incorporated herein by reference as if reproduced in their entirety.

Figure 8:
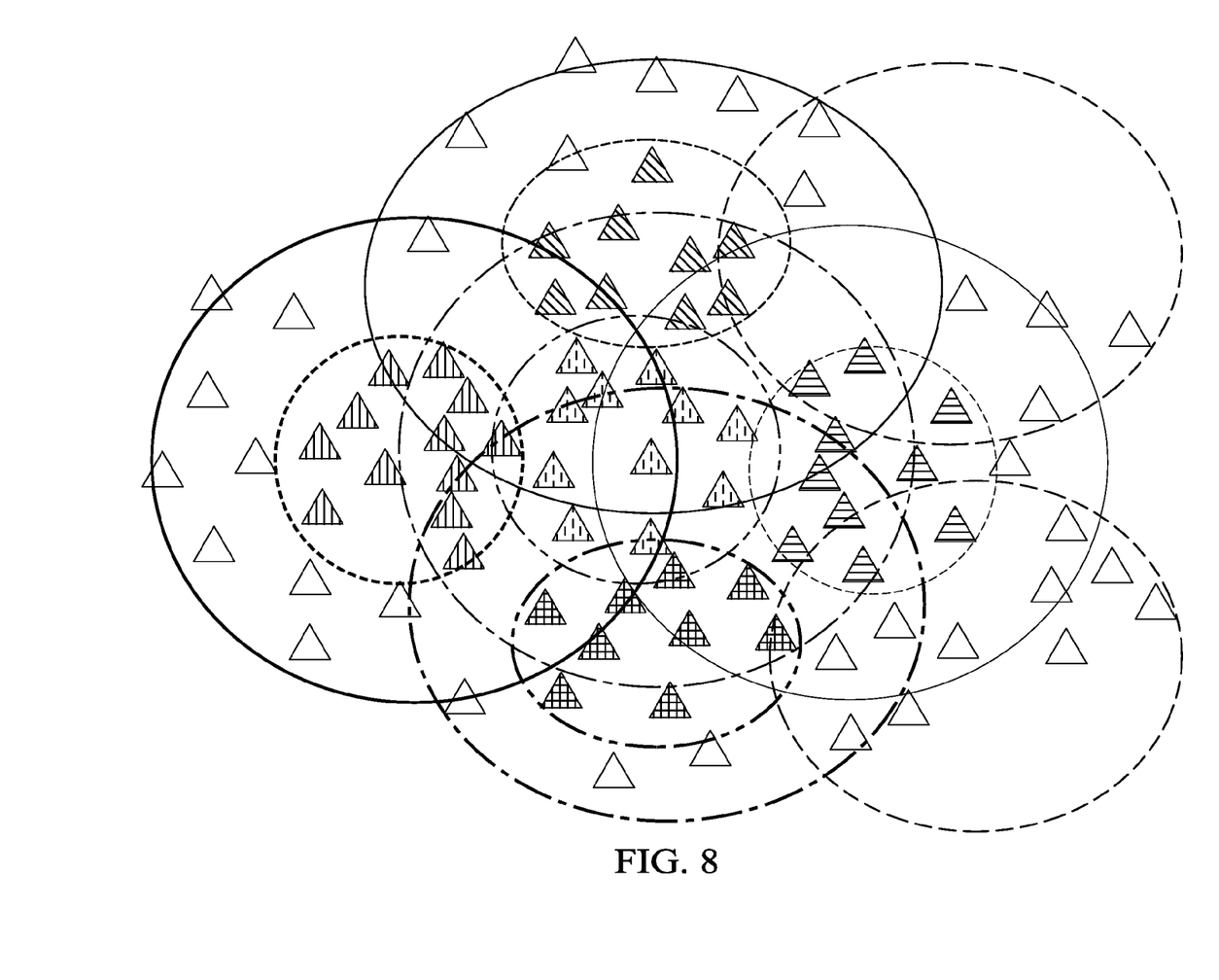
FIG. 8 illustrates an embodiment of a hierarchical/distributed implementation of a CSO scheme.

In embodiments, the CSO scheme above is implemented in a hierarchical/distributed manner. As illustrated in FIG. 8, the hierarchical/distributed implementation splits the cells (or BSs) in the network into multiple groups or clusters. In the figure, the cells are represented as triangles and the clusters are represented as circles. The clusters can overlap. This means that some cells can belong to more than one cluster (triangles can belong to more than one circle). In this approach, local decisions for the cells within each cluster can be made by obtaining only the traffic profiles of the cells in that cluster and comparing this information with a local database of pre-computed solutions. This can be accomplished in regular intervals. The grouping of the cells into clusters can be hierarchical, where a plurality of clusters can be further grouped into a larger cluster as a next level of the hierarchy. In this case, some traffic profiles require referring decisions to the next level in the hierarchy. This can be accomplished in larger intervals, e.g., less frequently than the decision making of the cells in a cluster.

Figure 9:
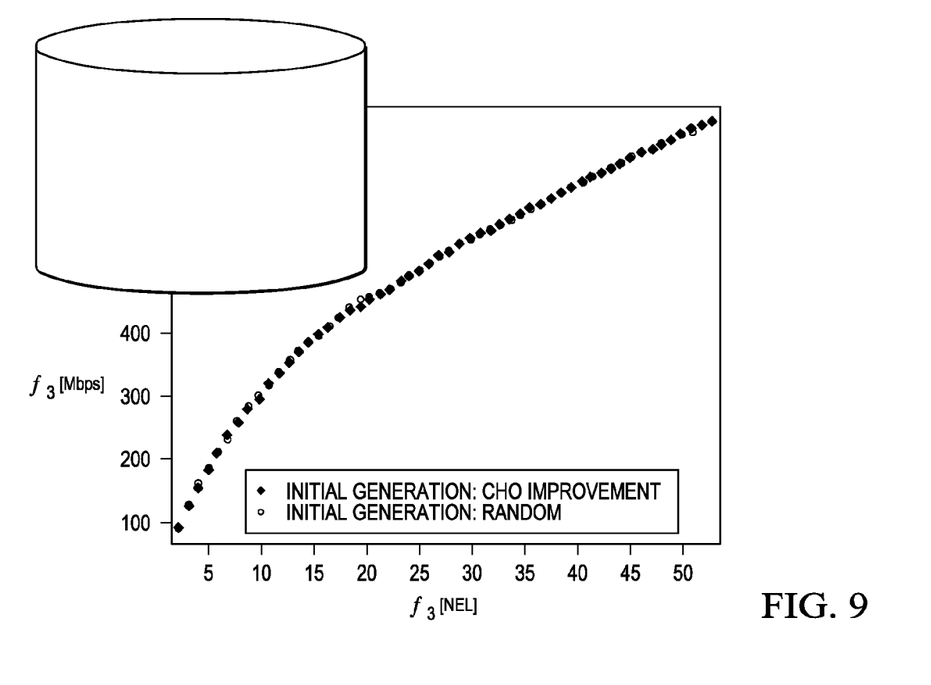
FIG. 9 illustrates stored CSO solutions for clusters of cells according to a hierarchical/distributed implementation.

FIG. 9 illustrates stored CSO solutions for clusters of cells according to a hierarchical/distributed implementation. The solutions are pre-computed and stored in a database. The database comprises multiple sets of solutions, where each set corresponds to a cluster of cells. In the figure, each grid represents a cell. The database comprises multiple clusters of cells. Each cluster is represented as a block of grids. Overlapping cells can belong to adjacent clusters, as shown. As such, different sets of solutions for different clusters can include overlapping cells. The CSO pattern of overlapping cells takes into account local decisions in neighboring clusters. If solutions based on the traffic of different clusters imply a different individual decision for an overlapping cell, a conservative approach can be adopted, such as keeping the overlapping cell on and excluding the overlapping cell from the switch-off operation.

Figure 10:
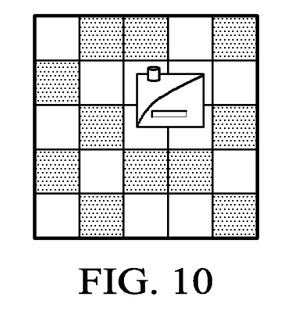
FIG. 10 illustrates stored CSO solutions for one cluster of FIG. 9.

FIG. 10 shows stored CSO solutions for one cluster in the mega-cluster of FIG. 9. In FIG. 10, a grouping of clusters, as shown in FIG. 9, is a larger cluster (a cluster of clusters), which is referred to herein as a mega-cluster. For a mega-cluster, global long term decisions (solutions to decide one solution from) can be made taking into account traffic profiles at longer time scales, e.g., 60 minutes. These solutions comprise of L=N×L' individual decisions, where N is the number of clusters in the mega-cluster and L' is the number of cells in the cluster. Thus, there is one decision for each cell in the mega-cluster.

Each cell, in a cluster of L' cells (L' is an integer), may have autonomous or local decisions (solutions) based on local traffic profiles created by exchanging information with other cells in the cluster. These local cell decisions can be taken in relatively small time scales, e.g., about 10 minutes. Each cell in the cluster can be associated with the same database of the traffic profiles and corresponding lookup tables. The local solutions comprise L' individual decisions, one for each cell in the cluster. The decisions can be sub-optimal, and hence are subjected to global decisions (at a network level). Traffic profiles (and corresponding set of solutions) can be accumulated and refined or updated based on historical observations, such as by statistical analysis of the observed traffic over time.

Figure 11:
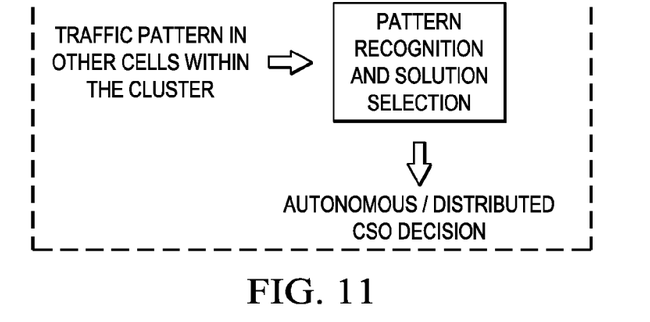
FIG. 11 illustrates an embodiment of an in-cell CSO decision.

FIG. 11 illustrates an embodiment of an in-cell CSO decision. The detected or observed traffic patterns (traffic profiles) in other cells within the same cluster of the considered cell are used as input to the decision and selection process of the solution. The pattern recognition and solution selection is then performed based on this input in addition to the traffic pattern of the considered cell. This provides an autonomous decision for this cell as part of the distributed CSO decision. The decision can then be used as input to the cluster decision (small time scales) and the mega-cluster decision (large time scales).

Figure 12:
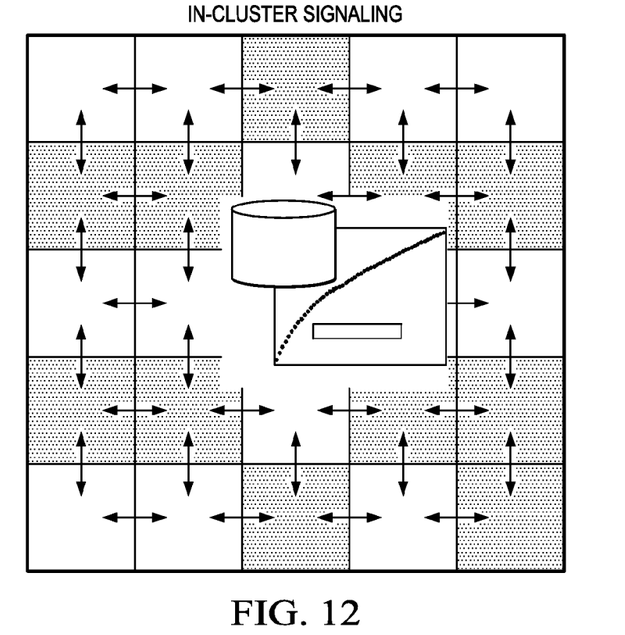
FIG. 12 illustrates a CSO in-cluster signaling for a CSO hierarchical/distributed operation.
Figure 13:
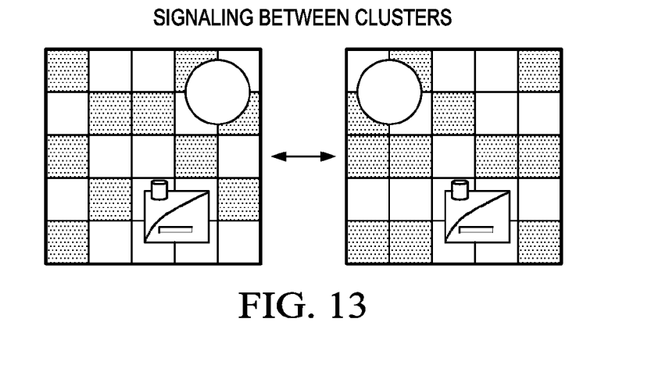
FIG. 13 illustrates a signaling between clusters of cells for a CSO hierarchical/distributed operation.
Figure 14:
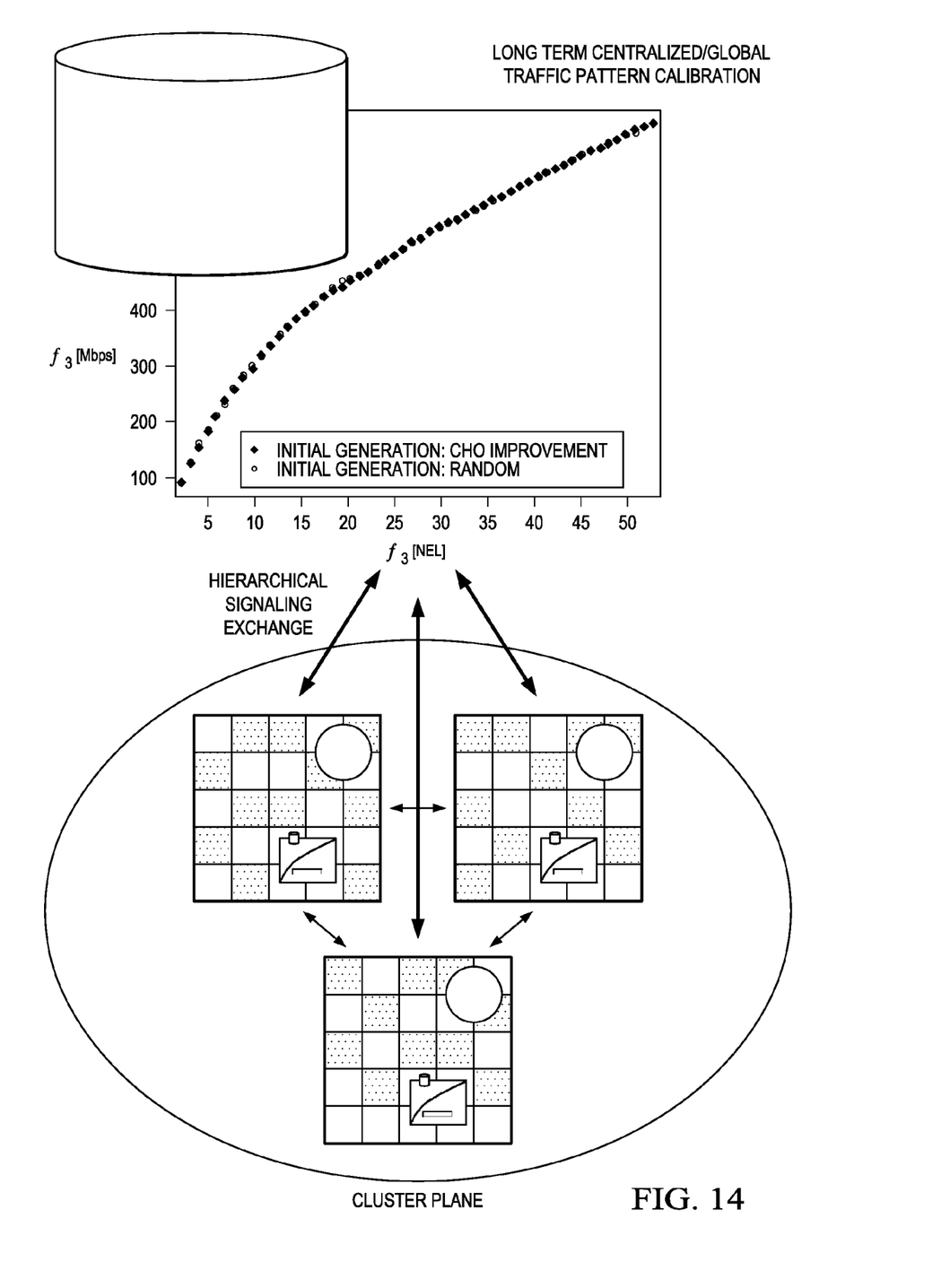
FIG. 14 illustrates a centralized/global traffic pattern calibration for a CSO hierarchical/distributed operation.

FIG. 12 shows a CSO in-cluster signaling for a CSO hierarchical/distributed operation. The traffic patterns are identified autonomously at each cell. This information is then propagated within the cluster (between the cells of the cluster) to allow for the distributed operation. For instance, the traffic pattern information can include the number of users (load) and the proportion of center and edge users (spatial information). FIG. 13 shows a signaling between clusters of cells for the CSO hierarchical/distributed operation. This signaling can be subsequent to the in-cluster signaling. The local (consolidated) traffic profiles within different clusters are exchanged among the clusters to improve the decision-making process, especially for the overlapping cells. FIG. 14 shows a centralized/global traffic pattern calibration for the CSO hierarchical/distributed operation. This operation can be subsequent to the signaling between clusters and implemented in the long term (large time scales). The signaling is exchanged between the cluster plane and a central network component, such as a network controller or server configured for this operation. Each cluster sends the consolidated traffic profile to the central network component, in a hierarchical signaling exchange. The central network component then performs long term near-optimal CSO decisions involving all considered cells in the network. The signaled solutions are used to further calibrate the autonomous CSO decisions taken locally by the cells within each cluster.

Figure 15:
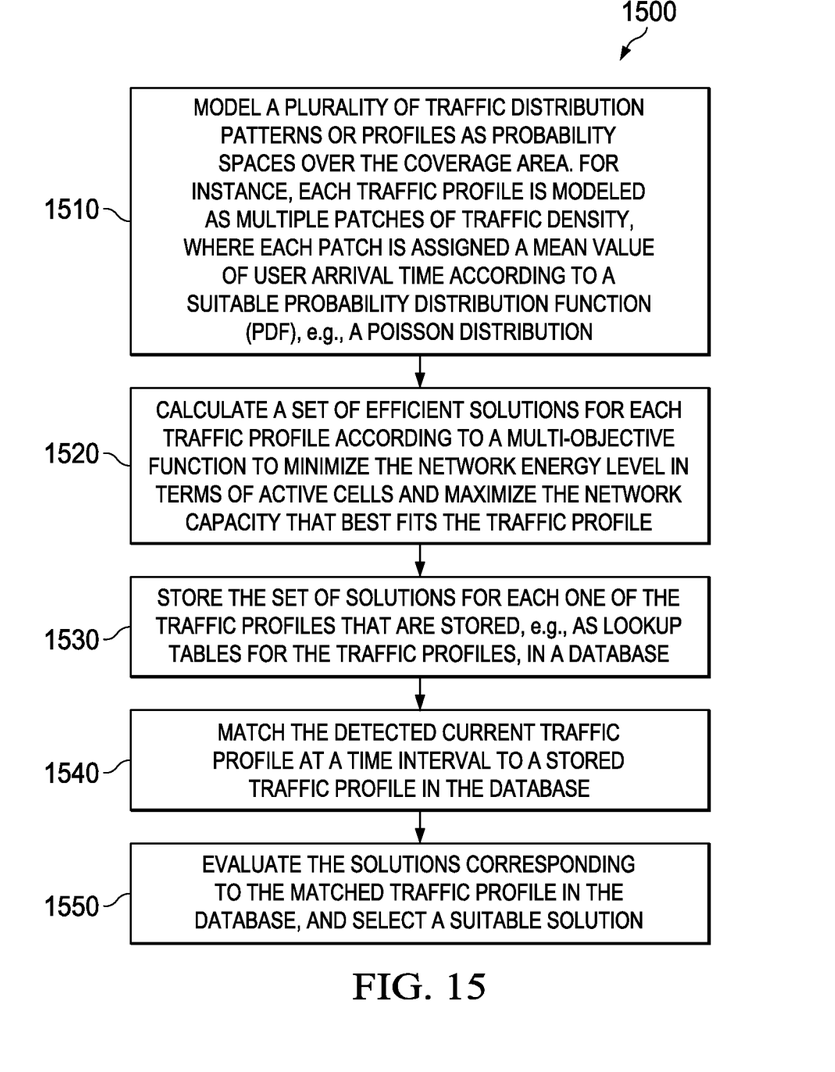
FIG. 15 illustrates an embodiment of a CSO method.

FIG. 15 illustrates an embodiment of a CSO method 1500. At step 1510, a plurality of traffic distribution patterns or profiles are modeled as probability spaces over the coverage area. For instance, each traffic profile is modeled as multiple patches of traffic density, where each patch is assigned a mean value of user arrival time according to a suitable probability distribution function (pdf), e.g., a Poisson distribution. At step 1520, a set of efficient solutions is calculated for each traffic profile according to a multi-objective function to minimize the network energy level in terms of active cells and maximize the network capacity that best fits the traffic profile. The multi-objective function can also be subject to the allowable outage constraint by the network provider or operator, e.g., in accordance with traffic needs or QoS requirements. The efficient solution for the multi-objective problem can be obtained as a set of Pareto efficient solutions determined for every given traffic profile. A near-optimal Pareto front (PF) can be found as a near-optimal solution to the multi-objective problem. At step 1530, the set of solutions for each one of the traffic profiles are stored, e.g., as lookup tables for the traffic profiles, in a database. At step 1540, the detected current traffic profile at a time interval is matched to a stored traffic profile in the database. This step can be implemented at a cell level, a cluster level, a mega-cluster level, or an overall network level, e.g., in accordance with a central or distributed hierarchical implementation. At step 1550, the solutions corresponding to the matched traffic profile in the database are evaluated, and a suitable solution is selected. For instance, the selected solution minimizes the number of active cells (energy level) but allows enough capacity to meet QoS requirements, e.g., minimizing transitions and handoffs. The selected solution can also be based on other constraints, such as guaranteeing provider coverage criteria to avoid significant coverage holes, radio resource management for fast fading environments, or other criteria.

Figure 16:
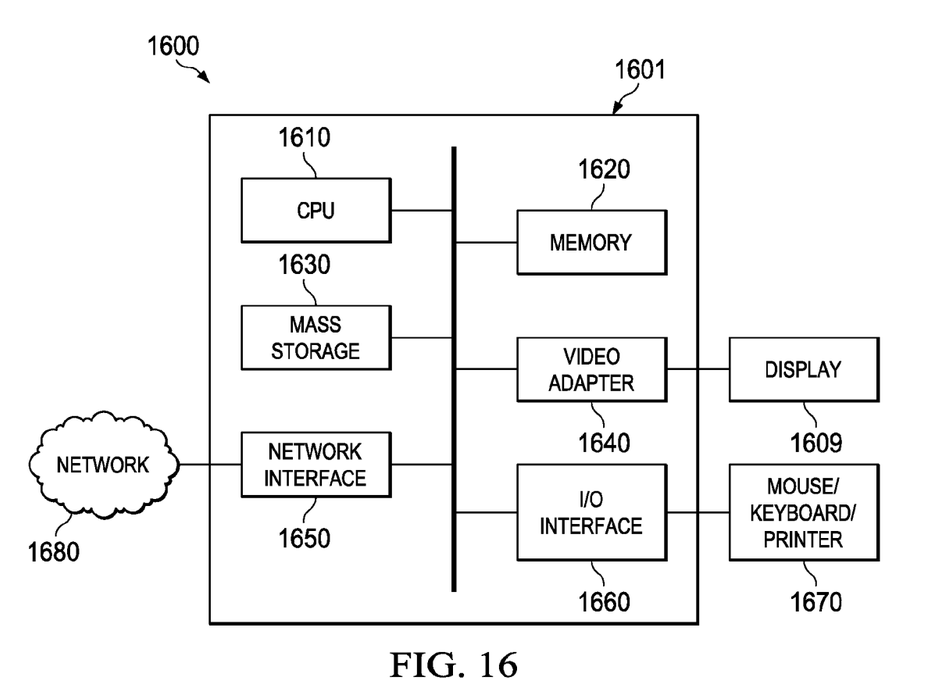
FIG. 16 is a diagram of a processing system that can be used to implement various embodiments.

FIG. 16 is a block diagram of a processing system 1600 that can be used to implement various embodiments. The processing system 1600 can be part of a BS or other network components. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1600 may comprise a processing unit 1601 equipped with one or more input/output devices, such as a speaker, microphone, mouse, touchscreen, keypad, keyboard, printer, display, and the like. The processing unit 1601 may include a central processing unit (CPU) 1610, a memory 1620, a mass storage device 1630, a video adapter 1640, and an I/O interface 1660 connected to a bus. The bus may be one or more of any type of several bus architectures including a memory bus or memory controller, a peripheral bus, a video bus, or the like.

The CPU 1610 may comprise any type of electronic data processor. The memory 1620 may comprise any type of system memory such as static random access memory (SRAM), dynamic random access memory (DRAM), synchronous DRAM (SDRAM), read-only memory (ROM), a combination thereof, or the like. In an embodiment, the memory 1620 may include ROM for use at boot-up, and DRAM for program and data storage for use while executing programs. In embodiments, the memory 1620 is non-transitory. The mass storage device 1630 may comprise any type of storage device configured to store data, programs, and other information and to make the data, programs, and other information accessible via the bus. The mass storage device 1630 may comprise, for example, one or more of a solid state drive, hard disk drive, a magnetic disk drive, an optical disk drive, or the like.

The video adapter 1640 and the I/O interface 1660 provide interfaces to couple external input and output devices to the processing unit. As illustrated, examples of input and output devices include a display 1690 coupled to the video adapter 1640 and any combination of mouse/keyboard/printer 1670 coupled to the I/O interface 1660. Other devices may be coupled to the processing unit 1601, and additional or fewer interface cards may be utilized. For example, a serial interface card (not shown) may be used to provide a serial interface for a printer.

The processing unit 1601 also includes one or more network interfaces 1650, which may comprise wired links, such as an Ethernet cable or the like, and/or wireless links to access nodes or one or more networks 1680. The network interface 1650 allows the processing unit 1601 to communicate with remote units via the networks 1680. For example, the network interface 1650 may provide wireless communication via one or more transmitters/transmit antennas and one or more receivers/receive antennas. In an embodiment, the processing unit 1601 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a network component for cell switch-off in a wireless network, the method comprising:
    determining, for each one of a plurality of traffic profiles, a set of Pareto-efficient solutions based on a number of active cells from a plurality of cells in the wireless network and on an aggregate network capacity, wherein the set of Pareto-efficient solutions for each one of the traffic profiles has a number of Pareto-efficient solutions proportional to a total number of the cells in the wireless network;
    matching a given traffic profile to one of the plurality of traffic profiles;
    evaluating performances of the set of Pareto-efficient solutions corresponding to the one of the plurality of traffic profiles;
    selecting a Pareto-efficient solution from the set of Pareto-efficient solutions in accordance with the evaluation, wherein the selected Pareto-efficient solution indicates which of a plurality of cells in the wireless network to be switched off; and
    switching off one or more cells of the plurality of cells in accordance with the selected Pareto-efficient solution.

2. The method of claim 1, wherein the determining comprises minimizing the number active cells while maintaining the aggregate network capacity that fulfills the given traffic profile and a quality of service (QoS) requirement, thereby minimizing a total number of on-off transitions and handoffs in the network.

3. The method of claim 1, wherein the determining comprises minimizing, subject to an allowable outage constraint, a difference between a first function of the number of active cells and a second function of the aggregate network capacity.

4. The method of claim 3, wherein minimizing the difference subject to the allowable outage constraint avoids significant gaps of coverage in the wireless network.

5. The method of claim 1 further comprising modeling the traffic profiles as probability spaces over a coverage area including the cells in the wireless network.

6. The method of claim 5, wherein the modeling includes modeling the coverage area as multiple patches of traffic density, and wherein each one of the patches is assigned a mean arrival time of users according to a probability distribution function.

7. The method of claim 1, wherein the given traffic profile is a current traffic distribution pattern detected in real-time during a predefine time interval of the wireless network.

8. The method of claim 1, wherein the determining includes calculating the set of Pareto-efficient solutions using one of a Multi-objective Evolutionary Algorithm (MOEA) and a heuristic minimum distance algorithm.

9. The method of claim 1, wherein the determining includes calculating near-optimal Pareto fronts as near-optimal solutions.

10. The method of claim 1, wherein the network component is one of a base station at one of the cells, a controller associated with a cluster of the cells, and a central network controller for all the cells.

11. A method performed by a network component for cell switch-off in a wireless network, the method comprising:
    modeling a plurality of traffic distribution patterns as probability spaces over a coverage area of the wireless network;
    calculating a set of Pareto-efficient solutions for each one of the traffic distribution patterns according to a multi-objective function that reduces a network energy level in terms of active cells while maintaining an aggregate network capacity according to traffic need, wherein the set of Pareto-efficient solutions for each one of the traffic distribution patterns has a number of Pareto-efficient solutions proportional to a total number of cells analyzed by the network component;
    storing the set of Pareto-efficient solutions for each one of the traffic distribution patterns in a database;
    detecting a current traffic distribution pattern of the wireless network at a predefined time interval;
    matching the current traffic distribution pattern to one of the traffic distribution patterns stored in the database;
    selecting a Pareto-efficient solution from the set of Pareto-efficient solutions corresponding to the one of the traffic distribution patterns; and
    switching off one or more cells in the wireless network in accordance with the selected Pareto-efficient solution for the one of the traffic patterns.

12. The method of claim 11, wherein the detecting, matching, and selecting steps are performed by the network component as part of a hierarchical and distributed implementation involving a plurality of cells and a plurality of clusters of cells in the wireless network.

13. The method of claim 12, wherein the network component is associated with one of the cells, and wherein detecting the current traffic distribution pattern includes exchanging traffic load information with other cells within a same cluster of cells in the wireless network.

14. The method of claim 13, wherein the cells of the same cluster share the database of the set of Pareto-efficient solutions for the modeled traffic distribution patterns.

15. The method of claim 12, wherein the network component is associated with one of the clusters of cells, wherein detecting the current traffic distribution pattern includes exchanging traffic load information with other clusters of cells in the wireless network, and wherein the Pareto-efficient solution is selected in accordance with individual Pareto-efficient solutions obtained from the cells of the one of the clusters.

16. The method of claim 12, wherein the network component is associated with a grouping of the clusters of cells, wherein detecting the current traffic distribution pattern includes exchanging traffic load information with other groups of clusters in the wireless network, and wherein the Pareto-efficient solution is selected in accordance with individual Pareto-efficient solutions obtained from the clusters in the grouping.

17. The method of claim 16, the detecting, matching, and selecting steps are performed by the network component associated with the grouping of the clusters of cells at a longer time interval in comparison to the clusters and cells.

18. The method of claim 12, wherein the network component is a global network component of the wireless network, and wherein selecting the Pareto-efficient solution includes calibrating between individual Pareto-efficient solutions obtained from the cells, the clusters of cells, or a plurality of groups of the clusters of cells.

19. The method of claim 11, wherein the number of Pareto-efficient solutions in the set of Pareto-efficient solutions for each one of the traffic distribution patterns also is proportional to a total number of clusters analyzed by the network component.

20. A network component enabling cell switch-off in a wireless network, the network component comprising:

at least one processor;

a non-transitory computer readable storage medium storing programming for execution by the at least one processor, the programming including instructions to:

determine, for each one of a plurality of traffic profiles, a set of Pareto-efficient solutions based on a number of active cells from a plurality of cells in the wireless network and on an aggregate network capacity, wherein the set of Pareto-efficient solutions for each one of the traffic profiles has a number of Pareto-efficient solutions proportional to a total number of the cells in the wireless network;

match a given traffic profile to one of the plurality of traffic profiles;

evaluate performances of the set of Pareto-efficient solutions corresponding to the one of the plurality of traffic profiles;

select a Pareto-efficient solution from the set of Pareto-efficient solutions in accordance with evaluating the performances of the Pareto-efficient solutions, wherein the selected Pareto-efficient solution indicates which of a plurality of cells in the wireless network to be switched off; and switch off one or more cells of the plurality of cells in accordance with the selected Pareto-efficient solution.

21. The network of claim 20, wherein the instructions to determine the set of Pareto-efficient solutions include further instructions to minimize the number active cells while maintaining the aggregate network capacity that fulfills the given traffic profile and a quality of service (QoS) requirement, thereby minimizing a total number of on-off transitions and handoffs in the network.

22. The network component of claim 20, wherein the wireless network is one of a heterogeneous network comprising macro cells and lower power cells, a network carrying bursty traffic, and an Orthogonal Frequency-Division Multiple Access (OFDMA) network.

\* \* \* \* \*